UNITED STATES PATENT OFFICE.

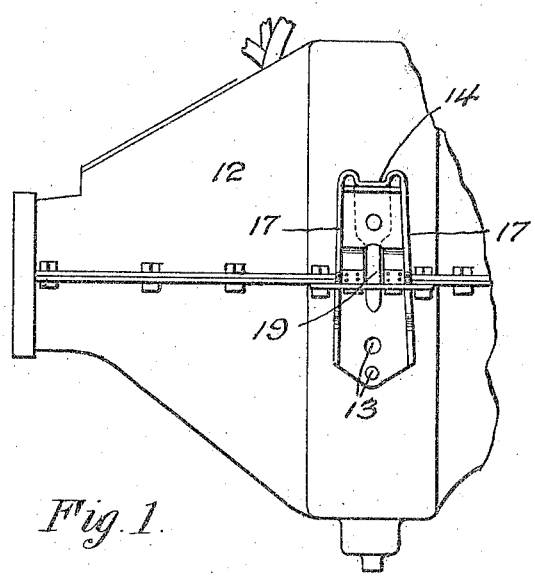
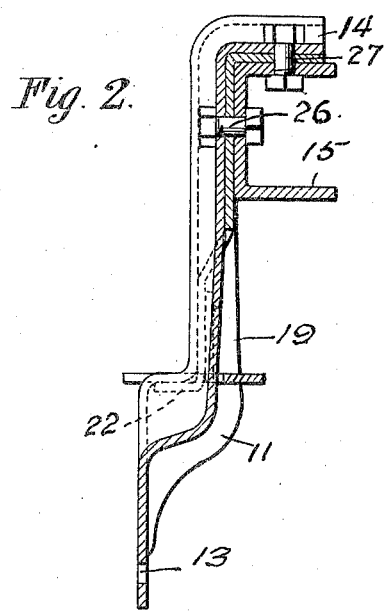
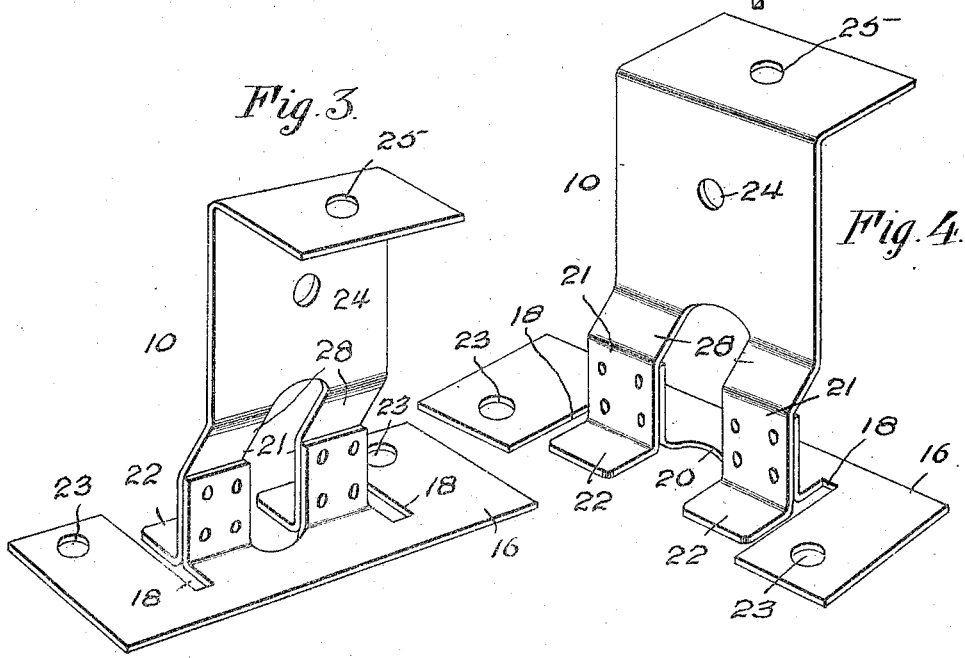

HENRY C. REICH, OF NEW YORK, N. Y.

REINFORCING AND REPAIR BRACKET.

1,303,391.   Specification of Letters Patent.   Patented May 13, 1919.

Application filed October 7, 1918. Serial No. 257,302.

*To all whom it may concern:*

Be it known that I, HENRY C. REICH, a citizen of the United States, residing at New York, in the county of New York, State of New York, have invented certain new and useful Improvements in Reinforcing and Repair Brackets, of which the following is a description, reference being had to the accompanying drawings, forming a part hereof.

My invention relates to an improved reinforcing and repair bracket especially adapted for use in the mounting of the crank case of a motor on the chassis of an automobile.

It has been found in one make of machine for which this improvement is specially intended that the brackets connecting the crank case of the motor and the frame of the machine are very often fractured, so often in fact that other devices have in the past been designed to meet the conditions brought about by said damage, and it is to accomplish the results attempted in other devices that this improvement was conceived, by first carefully considering the cause of breakage of the original mounting and then of the repair brackets on the market.

The stress on the parts as viewed by others attempting to cure the tendency to breakage has apparently been vibration alone, caused by the movement of the parts of the engine when running.

Applicant concedes that there is a considerable amount of vibration and necessarily a severe strain on the parts as a result thereof, but he has also found that the strain due to vibration and jar caused thereby is only a part of the strain applied to the parts and that only a small part. In other words, the intensity of the strain due to vibration is greatly accentuated by other conditions entirely distinct from said vibrating strain, and it is to meet the conditions as above referred to that applicant has devised his bracket after careful consideration and test.

Therefore, the objects in view are not only to provide a device of a simple and necessarily inexpensive character, but one in which vibration as well as gyroscopic stress, and the combination of the two are taken up, and it is in the peculiar formation and manner of construction that said benefits are gained.

While changes of a minor character may be resorted to within the scope of the claims, a preferred embodiment of the device will be seen in the accompanying drawings, in which similar numerals indicate corresponding parts in all the figures.

Figure 1 is a side elevation of a portion of a crank case of a motor showing my improved reinforcing and repair bracket in place.

Fig. 2 is an enlarged vertical section of a supporting bracket with my improved bracket in place.

Fig. 3 is a perspective view of my improved bracket as viewed from the outside.

Fig. 4 is a view similar to Fig. 3 as viewed from the opposite side.

Referring to the drawings, it may be pointed out that applicant's reinforcing or repair bracket 10 is adapted to be applied and snugly nested with the original bracket 11 mounted on the crank case 12, said original bracket 11 being shown in the drawings as riveted at 13 to the crank case and extending therefrom up and provided with a laterally extending portion 14 adapted to be secured to the frame 15 of the chassis of an automobile.

It is a well known fact that, due to the gyroscopic forces set up by a wheel revolving at high rate, there is a very great resistance to the rapid movement of the shaft on which the wheel is mounted that would change the plane of rotation of said wheel.

It will also be noted that the machines, wherein the breakage of the above mentioned brackets is most frequent, are of short wheel base, and are in many cases those in which the changes in direction of travel are most frequent and abrupt.

In the drawings a portion of an engine of a well known type is shown wherein the power plant, including the cylinders, shift gear mechanism, crank shaft and fly wheel, is all inclosed in a casing and may be considered in this connection as a unit, said unit having therein, when the engine is operating, a rapidly revolving fly wheel, thereby setting up in said unit a very great resistance to any disturbance of the longitudinal axis thereof.

Said unit as above referred to is mounted by brackets on the frame of an automobile and said frame in rounding curves must carry with it said unit and overcome, through said brackets, the tendency of said unit to remain, so far as its axis is concerned, undisturbed.

In other words, if it were possible to mount the power plant of an automobile on a single central vertical pivot the car could be operated around any number of curves or corners without altering the position of the driving shaft as originally extending in relation to the points of the compass, and it is with a view to meet said extreme gyroscopic force or resistance set up by the rotating fly wheel that applicant has constructed a bracket combining the elements of reinforcing the original bracket in the line of greatest strain and at the same time providing means whereby said resistance is overcome with the least likelihood of breakage of the parts, the latter being accomplished in two ways; first, by increasing the rigidity of the original bracket along the line of its greatest strain, and also by providing means for the transmission of the strain from one part to the other in a manner to relieve any sudden twisting strain to the bracket, said semi-flexible connecting feature being provided to relieve the twisting strain on the bracket due to gyroscopic action, and also relieve the jar due to vibration.

Applicant, therefore, provides his bracket 10 with a reinforcing portion 16 adapted to inclose and support the original bracket, which is at times constructed of pressed steel having flanges 17 at its outer edges, which fit into cut-away portions 18 in the member 16, and a central rib 19 fitting into the cut-away portion 20 of the plate 16, and between the supporting legs 21 of the bracket. Said supporting legs of the bracket are provided with inwardly extending members 22 adapted to rest beneath a portion of the original bracket and offers a semi-rigid connection between the parts to relieve the bolts and bracket from the jar of vibration.

The improved bracket is provided with bolt holes 23 adapted to receive the two adjacent bolts on either side of the original bracket which are used in securing together the members of the crank case, said bracket being also provided with bolt holes 24 and 25 in its supporting member to correspond with and receive bolts 26 and 27 mounting the original bracket to the frame 15.

To gain further semi-rigid support between the parts, offset portions 28 in the legs 21 are provided, as clearly shown in Figs. 3 and 4.

As above described, it will be seen that the improved bracket may and is preferably applied to the engine casing as a precautionary measure against breakage, but can also be quickly applied as a repairing means if the original bracket is fractured; that the reinforcing member 16, adapted to support the original bracket, is of a character to provide the greatest possible support, at the expense of the least amount of metal, and said support is located where the greatest twisting strain is applied to the bracket. Again it will be noted that any vibratory movement of any character or any twisting strain is taken up by the bracket in a semi-rigid manner, which greatly reduces the vibration to the chassis as well as to relieve the tendency to breakage.

Applicant's device will be stamped from metal and can be produced and supplied to the trade at a very low price and has practical value both in the saving of time and metal when used either as a repair or reinforcing bracket.

What I claim is:—

1. A reinforcing bracket fashioned with a slotted base plate and having an offset body portion bifurcated to form legs attached to the base plate, said legs terminating in inwardly projecting portions complementary with the base plate.

2. The combination with the flanged engine case, its flanged bracket, and the frame, of a reinforcing bracket fashioned with a slotted base plate to engage under the flange of the engine case and embrace the flanged bracket, said reinforcing bracket formed with spaced legs attached to the base plate and having extensions under the engine case flange, and the body portion of the reinforcing bracket having an offset therein to provide a semi-rigid connection between the engine case and the frame.

This specification signed and witnessed this 19th day of September, A. D. 1918.

HENRY C. REICH.

In the presence of—
 MAX BIEBER,
 ALEX FORSTEIN.

Copies of this patent may be obtained for five cents each, by addressing the "Commissioner of Patents, Washington, D. C."